US008798574B2

(12) United States Patent
Wienand

(10) Patent No.: US 8,798,574 B2
(45) Date of Patent: Aug. 5, 2014

(54) INFORMATION BROADCASTING SYSTEM

(76) Inventor: Neil Heinrich Wienand, Bonogin (AU)

( * ) Notice: Subject to any disclaimer, the term of this patent is extended or adjusted under 35 U.S.C. 154(b) by 316 days.

(21) Appl. No.: 12/602,050

(22) PCT Filed: May 30, 2008

(86) PCT No.: PCT/AU2008/000773

§ 371 (c)(1),
(2), (4) Date: Nov. 25, 2009

(87) PCT Pub. No.: WO2008/144835

PCT Pub. Date: Dec. 4, 2008

(65) Prior Publication Data

US 2010/0202337 A1 Aug. 12, 2010

(30) Foreign Application Priority Data

May 30, 2007 (AU) ................................ 2007902887

(51) Int. Cl.

| | |
|---|---|
| ***H04M 11/04*** | (2006.01) |
| ***H04H 20/71*** | (2008.01) |
| ***H04M 1/725*** | (2006.01) |
| ***H04M 3/00*** | (2006.01) |
| ***H04W 4/00*** | (2009.01) |
| ***H04W 24/00*** | (2009.01) |

(52) U.S. Cl.
USPC .................... 455/404.2; 455/3.03; 455/412.2; 455/418; 455/466; 455/456.1

(58) Field of Classification Search
USPC ................. 370/312; 455/404.1, 404.2, 414.1, 455/414.2, 414.4, 90.1, 3.03, 412.1, 412.2, 455/418, 466, 456.1; 340/539.1, 539.11
See application file for complete search history.

(56) References Cited

U.S. PATENT DOCUMENTS

| | | | | |
|---|---|---|---|---|
| 6,084,510 | A | 7/2000 | Lemelson et al. | |
| 6,097,949 | A * | 8/2000 | Jung et al. | 455/466 |
| 6,169,476 | B1 | 1/2001 | Flanagan | |
| 6,329,904 | B1 | 12/2001 | Lamb | |
| 6,463,273 | B1 | 10/2002 | Day | |
| 6,608,559 | B1 | 8/2003 | Lemelson et al. | |
| 6,633,240 | B1 | 10/2003 | Sweatt | |
| 6,696,942 | B2 | 2/2004 | Sweatt | |
| 6,816,878 | B1 | 11/2004 | Zimmers | |
| 6,867,688 | B2 | 3/2005 | Lamb | |
| 7,039,386 | B2 | 5/2006 | Kolsrud | |

(Continued)

FOREIGN PATENT DOCUMENTS

| | | | |
|---|---|---|---|
| CA | 2453373 | A1 | 4/2004 |
| EP | 1544825 | A1 | 6/2005 |
| NZ | 250354 | | 12/1993 |
| WO | 0077755 | A1 | 12/2000 |

*Primary Examiner* — Christopher M Brandt
(74) *Attorney, Agent, or Firm* — Volpe and Koenig, P.C.

(57) ABSTRACT

Provided is an information broadcasting system for broadcasting information to subscribers of the system. The system includes an information receiving module that is configured to receive information from a monitoring authority, and an information transmitting module that is configured to receive the information from the information receiving module. The transmitting module is also configured to transmit coded data relating to the information to relay stations in at least one pre-selected geographical location to be relayed to subscribed communications devices in said at least one pre-selected geographical location. The coded data is configured to correspond with at least one information component stored on said communications devices such that on receipt of the coded data, the subscribed communications devices generate a notification corresponding to said at least one information component.

13 Claims, 4 Drawing Sheets

(56) References Cited

U.S. PATENT DOCUMENTS

| | | | | |
|---|---|---|---|---|
| 7,049,971 | B2 | 5/2006 | Guillory | |
| 7,053,753 | B2 | 5/2006 | Kacalek et al. | |
| 7,054,612 | B2 | 5/2006 | Patel | |
| 7,084,775 | B1 | 8/2006 | Smith | |
| 7,515,041 | B2 | 4/2009 | Eisold et al. | |
| 2003/0092450 | A1* | 5/2003 | Juppi et al. | 455/456 |
| 2005/0084240 | A1* | 4/2005 | Faisy | 386/83 |
| 2005/0227672 | A1 | 10/2005 | Lauzon et al. | |
| 2007/0008109 | A1 | 1/2007 | Wang | |
| 2010/0003945 | A1 | 1/2010 | Primo et al. | |

* cited by examiner

Processing of Encrypted coded CBS by an EDWARDS enabled MS

INFORMATION BROADCASTING SYSTEM

FIELD OF THE INVENTION

This invention relates to the broadcasting of information. In particular, this invention relates to an information broadcasting system, a method for broadcasting and a software product for enabling an information broadcasting system.

BACKGROUND OF THE INVENTION

In recent years, the need to protect people from the effects of major disasters, both natural and man-made, has been highlighted. The most effective way of saving lives is for those people in effected areas to receive an early warning of an impending disaster.

At present, authorities around the world have been able to communicate effectively with their employees and other emergency personnel through well-established protocols specifically set up for that purpose. The difficulty has been to reach members of the public in an impending disaster area so that those people can begin to evacuate and take other measures to protect themselves.

At the moment, emergency and other associated personnel have to be apprised of a particular situation first and then they have to get that information to the public. As a result, precious time is lost which can equate to loss of life.

Not only is there a need for the information to be received quickly, there is also a need for accurate information to be received by the public. The nature of the information is important for two main reasons. Firstly, it has to be accurate so that the recipient knows exactly what to do. Secondly, it must have authority. Because of the large amount of unsolicited information the public receives presently, there is a high level of cynicism in the public concerning such information.

SUMMARY OF THE INVENTION

According to a first aspect of the invention, there is provided an information broadcasting system for broadcasting information to subscribers of the system, the system including an information receiving module that is configured to receive information from a monitoring authority; and an information transmitting module that is configured to receive the information from the information receiving module and to transmit coded data relating to the information to relaying stations in at least one pre-selected geographical location to be relayed to subscribed communications devices in said at least one pre-selected geographical location, said coded data being configured to correspond with at least one information component stored on said communications devices such that on receipt of the coded data, the subscribed communications devices generate a notification corresponding to said at least one information component.

The information receiving module may be configured to permit an operator to select one or more geographical locations to which the information component is to be relayed. The invention is also intended to cover automated selection of said one or more geographical locations. Accordingly, the information receiving module may be configured to select one or more geographical locations automatically according to the information received from the monitoring authority.

The information transmitting module may be configured to co-operate with an existing wireless network, such as a GSM, 3G, Next G or CDMA network, to generate a Cell Broadcast short message service (CBS) message on the subscriber devices. Thus, the notification corresponding to said at least one information component may be in the form of a text message displayed on the devices. Furthermore, said information components may relate to specific information for the subscribers with respect to the information generated by the monitoring authority.

In a preferred embodiment, the information transmitting module may be configured to transmit the coded data corresponding with information components stored on Subscriber Identity Modules (known as SIM's), supplied by the provider to the subscribers, or which are pre-programmed by the provider, or which can be uploaded to the communications devices by the provider and stored in a memory of the communications devices.

Thus, the system may include Base Station Controllers (BSC's) in pre-selected geographical locations. The BSC's may be configured to receive the data from the information transmitting module which may be configured to transmit the data to a BSC in a geographical location where subscribers are to receive the information. The BSC's may be configured to relay that data to transceivers or relaying stations, in the form of Base Transceiver Stations (BTS's) in the geographical location.

The data generated by the information transmitting module may also be configured to actuate pre-programmed instructions stored in the SIM or the device itself to cause the device to generate a unique signal readily discernible by the subscriber. It may also be configured to cause the device to vibrate, and or display a text message and or flash its lights.

According to a second aspect of the invention, there is provided a method of broadcasting information over a selected geographical area, the method including the steps of:

receiving the information from a monitoring authority;

transmitting coded data relating to the information to relaying stations in at least one pre-selected geographical area; and relaying said coded data to communications devices in said at least one pre-selected geographical location, said coded data being configured to correspond with at least one information component stored on said communications devices such that, on receipt of the coded data, the subscribed communications devices generate a notification corresponding to said at least one information component.

According to a third aspect of the invention, there is provided a communications device for use with an information broadcasting system for broadcasting information to subscribers of the system, the communications device including a data storage means in which a plurality of information components are stored relating to coded data transmitted by the information broadcasting system; and a data processing means that is configured to match coded data received from the information broadcasting system with one or more respective information components and to generate a notification corresponding to said one or more respective information components.

According to a fourth aspect of the invention, there is provided a software product for execution by the communications device of the preceding aspect of the invention, the software product including a set of instructions, that, when executed, cause the communications device to:

generate a notification corresponding to one or more respective information components in response to a signal from a relaying station, the signal carrying coded data associated with said one or more of the respective information components.

The Invention is now described, by way of example only, with reference to the accompanying drawings. The following description is intended only to describe specific preferred embodiments of the invention known to the Applicant. As such, the following description is not intended to limit the scope of the preceding paragraphs or appended claims.

DETAILED DESCRIPTION OF THE DRAWINGS

The description may include or make reference to the following acronyms, a list of which is included for ease of reference:

ADWS—Advanced Disaster Warning System
ADWM—Advanced Disaster Warning Message
AuC—Authentication Centre
BCC—Broadcast Control Channel
BSC—Base Station Controller (radio part of transmitting CBS)
BSIC—Base Station Identity Code
BTS—Base Transceiver Station
CB—Cell Broadcast
CBC—CB Centre (connects to BSCs and handles GSM function of CBS)
CBCH—Cell Broadcast Channel
CBE—Cell Broadcast Entity (generates the CBS)
CBS—Cell Broadcast Short Message Service
EDWARDS—Emergency Disaster Warning And Rescue Device & System
EIR—Equipment Identity Register
EPIRB—Emergency Position Indicating Radio Beacon
GPRS—General Packet Radio Service
GSDMG—Government State Disaster Management Group
GSM—Global System for Mobile Communications
HLR—Home Location Register
IMEI—International Mobile Equipment Identity
IMSI—International Mobile Subscriber Identity
LCD—Liquid Crystal Display
ME—Mobile Equipment
MS—Mobile Station
MSC—Mobile Services Switching Centre
N/O—Network Operator
NSS—Network Subsystem
OTA—Over the Air
PDA—Personal Digital Assistant
PLMN—Public Land Mobile Network
PTWC—Pacific Tsunami Warning Centre
SDCC—Standalone Dedicated Control Channel
SEWS—Standard Emergency Warning Signal
SIM—Subscriber Identity Module
SMS—Short Message Service
SP—Service Provider
SR—Subscriber Register
VLR—Visitor Location Register Aspects of the invention will now be described with reference to specific embodiments thereof. Reference to "an embodiment" or "one embodiment" is made in an inclusive rather than restrictive sense. As such, reference to particular features found in one embodiment does not exclude those features from other embodiments.

The following description is intended to assist a person skilled in the art with understanding the invention. Accordingly, features commonplace in the art are not described in particular detail, as such features will be readily understood by the skilled person.

Figure 1:
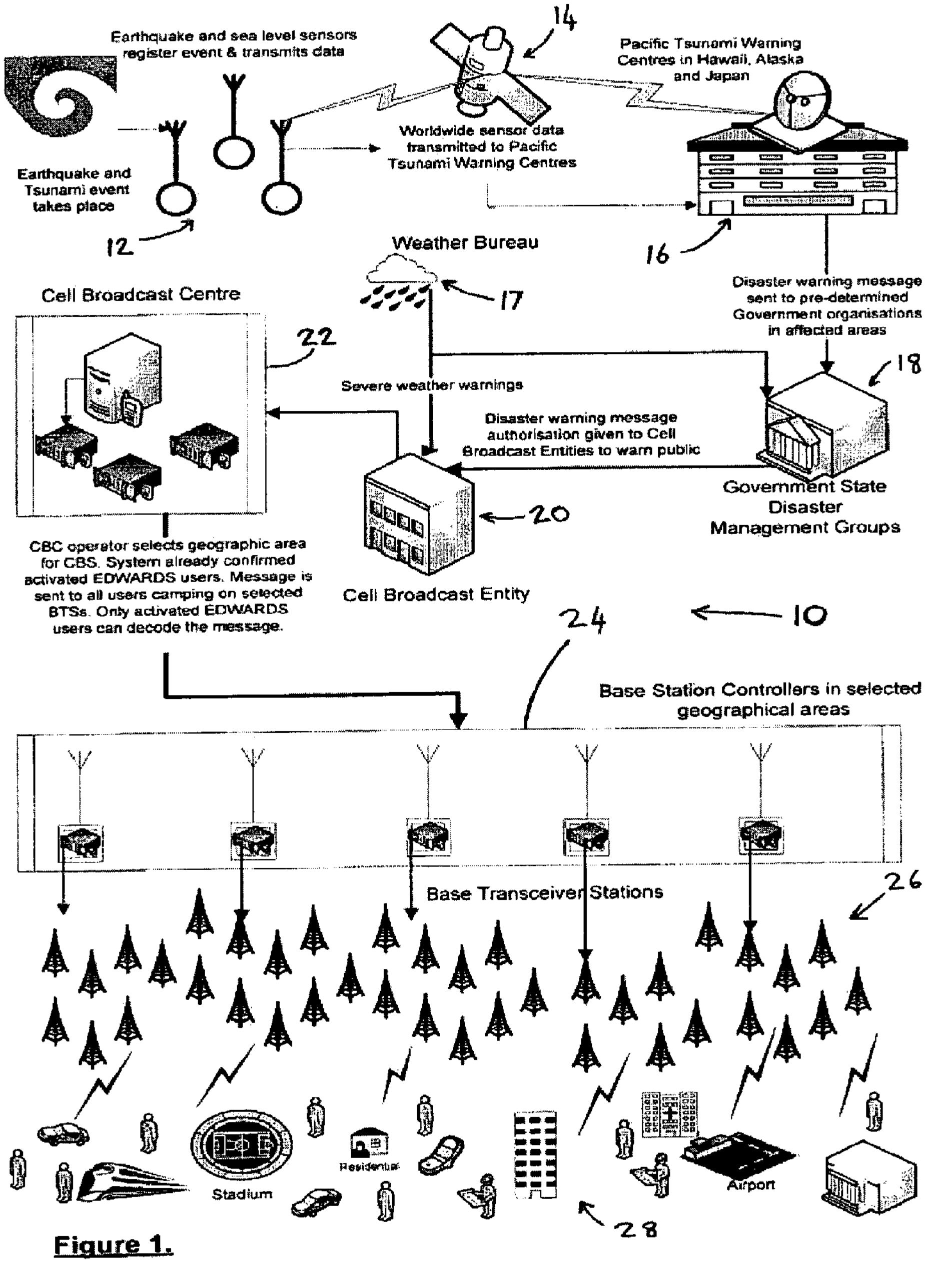
FIG. 1 shows a layout of an embodiment of a system, in accordance with the invention for broadcasting information to subscribers of the system.

In FIG. 1, reference numeral 10 generally indicates an embodiment of a system, in accordance with the invention, for broadcasting information to subscribers of the system 10. Reference hereafter to "EDWARDS" generally refers to the system 10.

The system 10 described with reference to FIG. 1 is used together with a tsunami early warning arrangement. The arrangement has a plurality of earthquake and sea level sensors indicated at 12. At 14, sensor data is transmitted to a Pacific Tsunami Early Warning Centre 16.

The centre 16 transmits a disaster warning message to pre-determined government, state and/or other disaster management groups (GSDMG) 18. A further example is the transmission of severe weather conditions by a weather bureau 17 to the GSDMG 18, as shown.

This embodiment of the invention is implemented when the GSDMG 18 transmits the message to an information receiving module in the form of a Cell Broadcast Entity (CBE) 20. The CBE 20 may also receive the message directly from the weather bureau 17. The CBE 20 transmits the message to an information transmitting module in the form of a Cell Broadcast Centre (CBC) 22.

At the CBC 22, coded data relating to the information in the message is generated. The generation and structure of the coded data is described in further detail below.

The CBC 22 is configured to transmit the coded data to transceivers or relaying stations in the form of Base Station Controllers (BSC's) 24 and related Base Transceiver Stations (BTS's) 26 in one or more geographical locations affected by the impending tsunami (in this example).

As indicated in FIG. 1 at 28, communications devices for the system 10 can take many different forms, such as those found in public transport, sports stadiums, airports, residences and mobile telephones. It is to be appreciated that the invention includes any manner of communications device that is configurable to generate a notification to notify people during an emergency situation.

The CBC 22, together with the BSC 24 and BTS 26, are configured to transmit the coded data on an existing wireless communications network, such as a GSM or CDMA network. Furthermore, the CBC 22, BSC 24 and BTS are configured to transmit the coded data on a radio channel dedicated for that purpose. As such, the CBC 22, BSC 24 and BTS 26 collectively represent an information transmitting module. The coded data may be transmitted using a Short Messaging Service (SMS) broadcast protocol, also referred to as a Cell Broadcast (CB) message protocol.

The dedicated channel can include a Broadcast Control Channel (BCC) in which the BSCs 24 recognize a channel in which broadcasts (Cell Broadcasts or CBs) carrying instructions given by the CBC 22 are carried. In one example, the dedicated channel can be a pre-determined Cell Broadcast Channel (CBCH). In another example, the dedicated channel can be a Standalone Dedicated Control Channel (SDCC). It is to be understood that any other suitable channel for CBs could be used and the previous examples are merely illustrative.

The information provided by the GSDMG 18 is transformed into a CB short message by the CBE 20 if required. In one instance the GSDMG 18 can decide to send an already configured warning message that the CBE 20 automatically forwards on for transmission. This option can ensure that the GSDMG 18 has full and exclusive control over the message content and transmission if required. The CBE 20 is configured to carry out all aspects of the necessary formatting of the CB message, including, for example, splitting the message into "pages" if necessary.

The CBC 22 is configured to handle all network (in this example GSM) related functions of the CB short message service (CBS). The CBC 22 can be connected to more than one of the CBEs 20.

The CBC 22 is connected to the BSCs 24 and is configured to coordinate the formatting and organization of the messages it receives from the CBE 20 into GSM or relevant network type format. In particular, in one embodiment of the invention, the CBC 22 is configured to:

a. Select the required CBCH to be used for messages.

b. Allocate serial numbers for messages such that the BSCs 24 can determine whether or not a particular message has been sent.

c. Modify or delete messages previously stored in the BSCs 24 where such messages are no longer relevant.

d. Initiate, set language, set starting time for transmission and determine geographical area for messages.

e. Determine a rate at which certain messages are to be sent.

f. Determine when a message should no longer be transmitted.

Each BSC 24 is connected to one CBC 22 and to one or more of the BTS's 26. Each BSC 24 is configured to:

a. Receive and interpret messages and commands from the associated CBC 22.

b. Store the messages for as, long as they are to be transmitted.

c. Route the messages to the appropriate BTSs 26. This is necessary since it is possible that different BTSs 26 connected to one CBC 22 are associated with different geographical areas to which different CBS messages have to be transmitted.

d. Schedule messages according to a repetition rate specified by the CBC 22.

e. Transmit each message at a time specified by the CBC 22.

A Network Operator (N/O) is typically located at the CBC 22. Conventionally, the CBC 22 is configured to enable control of the broadcasting of the CBS messages. Thus, the CBC 22 contains registers. Such registers include registers usually required for normal operation such as a Home Location Register (HLR), a Visitors Location Register (VLR) and an Equipment Identity Register (EIR). These registers can be configured to identify which users are subscribers to the system 10.

Alternatively, the CBC 22 contains a Subscriber Register (SR). A SR has the same format as the other registers for the sake of standards conformity.

Each subscriber to the system 10 is provided with a pre-programmed Subscriber Identity Module (SIM) carrying an embodiment, in accordance with the invention, of a software product that allows access to a network on which the system 10 is implemented.

Alternatively, the software product can be uploaded to subscribers' communications devices via an OTA (over-the-air) upload. This allows a SIM or other programmable hardware of a communications device to be updated with the required software product with very little inconvenience to the subscriber and the provider.

The EIR is a database of all participating communication devices on the network. Each communications device can be identified by its international mobile equipment identity (IMEI) code if relevant or any other equipment code usually stored in the hardware or removable media of the communications device. The CBC 22 is configured to enable the N/O to ensure that there is sufficient space on the HLR and VLR to accommodate new users and also to ensure that the SR can be incorporated and managed.

The CBC 22 is configured to permit the N/O to send updates of data, including code lists, (explained hereunder) to selected communication devices. The CBC 22 is also configured to permit the N/O to send an instructional message to specific communications devices that can delete the data or deactivate the software product in the SIM or programmed into the communications device.

In contrast, the CBC 22 is also configured to allow the N/O to send an instructional message to specific communication devices that will activate the software of the invention and upload data, including code lists.

The system 10 is configured to permit the sending of messages to specific groups of subscribers. These groups can be identified in coded data (as explained below) and transmitted to the communications devices of subscribers. When a subscribed communications device receives a message not intended for that subscriber, that message is ignored because the database stored on the communications device of that particular subscriber does not have an entry in a code list or table stored on the communications device corresponding to the code transmitted.

Cell Broadcast technology can provide for 64,000 broadcast channels so that different types of messages can be broadcast on different channels to different target groups. Not every subscriber necessarily receives all the channels and hence all the messages.

A distinction between target groups in the coded message is required to ensure correct delivery within a common channel used to transmit messages. In a preferred embodiment, channels are allocated for respective message types and these are standardised so that roaming subscribers can receive alerts specific to the geographical location they are in at the time.

It is to be understood that the primary function of the system 10 is to send an instant disaster warning message to the public as well as to selected subscriber organisations such as the police, military, navy, emergency service, search and rescue, etc. Messages can be sent to specific subscriber organisations only or selected organizations or both.

It is to be appreciated that the CB message protocol selected by the Applicant provides an advantage over bulk SMS that has a maximum delivery limitation of about 1,000 messages per second per SMS sent. Furthermore, the CB message protocol can be utilised when infrastructure is both damaged or overloaded and even when communications device signals are too weak to make voice calls. As is known, SMS messages and CBS messages can be transmitted when the signal is too weak for voice traffic.

Furthermore, in disasters, network loading problems can cause severe problems and normal traffic can be disrupted. In such circumstances, SMS messages which are transmitted in a conventional manner can be delayed for hours or days or even lost altogether.

Accordingly, an embodiment of the system 10 operates broadly as follows:

a. The GSDMG 18 receives information of an impending disaster from the specific tsunami or similar warning centre 16.
b. The GSDMG 18 decides to warn the public and transmits a secure message to pre-arranged CBEs 20.
c. The CBEs 20 and CBC 22 are controlled by the N/O. The N/O receives the warning message from the GSDMG 18 and the following occurs:
   (i) The CBE 20 selects an appropriate code message for the Cell Broadcast, or forwards an already appropriately coded message, received from the GSDMG 18, on for transmission.
   (ii) The CBC 22 selects the BSCs 24 in the target geographical areas in order to target BTSs 26 in the target geographical areas. This function can also be automated, allowing the disaster management group 18 to pre-select the target geographical areas.
   (iii) The CBE 20 transmits the coded CB message.
   (iv) The N/O or the authorities can decide to send the CB message as a non-coded text message as an immediate message display to all subscribers on a network and not just to subscribers to the system 10.
d. The selected BSCs 24 transmit the message to all or to geographically selected BTSs 26 under their control, thereby transmitting a message to all subscribers camping on each of the BTSs 26.
e. All communications devices logged into a network and camping on the targeted BTSs 26 receive the message.
f. A communications device that does not have the code list stored in the SIM or uploaded will not recognize the CB message. If the message is received, it will be a meaningless string of code.
g. All communications devices incorporating the coded data are programmed by an embodiment, in accordance with the invention, of a software product to cause the communications devices to perform one or more of the following actions:
   (i) Flash lights and/or sound a loud alarm in the form of the Standard Emergency Warning Signal (SEWS) used in the geographical location at full volume.
   (ii) Vibrate in a non standard fashion to attract a user's attention.
   (iii) Display the disaster or warning message on an LCD screen of the communications device.
   (iv) Not interrupt or not cut off any communications operation in progress with the communications device. In one embodiment, only once a call in progress has ended will the SEWS alarm sound.
   (v) React differently to different types of messages.
   (vi) Continue the alarm and flashing light until any button is pressed to acknowledge receipt of the message or for a pre-determined time or until the power supply of the communications device is drained.

As such, the invention extends to a communications device suitable for use with the system 10, as described above.

Broadly, the communications device is provided with a pre-programmed SIM or with a program transmitted by a provider to the communications device.

One example of a SIM used in one embodiment is what is known as a "proactive" SIM. The technical specification defining the protocol of communications between a conventional SIM and the communications device is known as the T1/4 protocol for 118 mobile messaging technology and services (the USIM). A characteristic of this protocol is that the communications device initiates all commands to the SIM. This would be a specific limitation in the enablement of one embodiment of the invention. Thus, a SIM making use of proactive commands is implemented and is known as a proactive SIM. With proactive commands, the SIM is able to send a command to the communications device.

In the implementation of this invention, the SIM or uploaded software is configured to ensure that the communications device can decode the coded message received and can deliver an appropriate action.

In particular, the software product is configured so that, when executed, the communications device can carry out any one of the following operations:

a. SEWS (see above), flashing lights and/or soft beeper and vibrating alert.
b. Message display and lights flashing in the event that the message is related to an emergency.
c. Respond to any button pressed to reset the communications device and to turn off the alarm and the lights. In the event that no button is pressed, the alarm mode is continued for a pre-determined period of time and stopped. Any suitable pattern of repeating and stopping can be implemented.

The software product, when executed, is configured to update data stored in the SIM or the communications device by an over the air (OTA) update patch. The software product is configured so that a confirmation message is generated to confirm a successful update to the N/O and added to the appropriate register.

It will be appreciated that the Applicant foresees the capability of a service provider preloading a code list in order to reduce network traffic resulting from OTA update patches.

The system 10 is configured so that a complete emergency code list is transmitted via OTA to a subscribed communications device once that communications device is activated. The required SEWS warning tone can be uploaded from the SIM, pre-loaded on the communications device or sent to the communications device via an OTA transmission. The system 10 can be configured to update the code list on a monthly or other regular basis without user intervention.

Furthermore, the system 10 is configured so that the same code will not be re-used for at least two to four years to prevent incorrect warnings in the event that an outdated patch remains on a particular communications device. If an emergency broadcast is required to be sent before all the subscribers have received the latest code update patch, the N/O will automatically send the old and the new code to ensure that non-updated subscribers also receive the warning message.

The system 10 is configured to generate hourly test messages to determine whether or not subscribed communications devices contain the correct code list. In the event that an incorrect code list is detected by the test message, a message warning the subscriber is generated and further processing of messages from the system 10 will then be blocked. The system is configured to accommodate updates to new code lists in order to avoid error messages during a code update.

The system 10 is configured so that the HLR and VLR indicate which users are not logged onto the system 10 so that they are not sent an update. The reason is to prevent such subscribers from receiving an update when they are roaming outside of the usual geographical area. On the other hand, subscribers will receive a code list update from a network to which their communications devices are logged onto in the event that such a network implements the system 10.

The CBC 22 can be configured so that the N/O can maintain the database along with the HLR of communications devices that have been updated, by recording an update version number. Updates for communications devices that were not updated are repeated regularly until they have been updated or a new update is available.

It will be appreciated that current updates can change entire complete code databases in the communications devices on any pre-determined interval. This can be determined depending on the level of security required. In the event that a roaming subscriber logs onto a network other than its home network, the network authenticates the user as a visitor in the appropriate register (VLR). Furthermore, the network confirms that the user is a roaming subscriber. The relevant CBC 22 is configured to forward a code update for that network immediately to the roaming subscriber's communication device to ensure that emergency message codes valid for that network are interpreted correctly by the subscriber's communications device.

In the event that a user has a version of the software product, in accordance with the invention, obtained in the home country compared to the one in the roaming country, the software product is configured to be executable regardless of the version to enable interpretation of the relevant codes correctly.

The CBC 22 is configured such that if a subscriber's subscription expires, a reminder code or message can be sent via SMS. In the event of non-payment, the CBC 22 is configured so that the communications device can be deactivated via a coded SMS or an OTA update that will purge the code list and block use of the software product in the communications device.

The software product is configured so that the communications device is provided with a menu function to run a self-test. Thus, the software product can be configured to run a check on the communications device, the software product version and to confirm the latest patch version number and connectivity. A suitable alarm such as an audible alarm and lights can activate for a few seconds to indicate that the communications device is operating correctly.

Each coded message received by the communications device via the CBC 22 contains a code that is executed to trigger a specific action on the communications device. These actions include:

a. An emergency disaster message or warning messages code triggers an alarm, a vibration, a text message and lights on the communications device.
b. A threat warning message creates the same action as the emergency disaster message in the communications device, or could be slightly different.
c. An advisory message will not trigger the alarm. However, a suitable audible tone is generated and the advisory text message is displayed.
d. A test message activates a self-test function and displays a corresponding message on a display of the communications device in the event that the test is successful. A test failure can refer the subscriber to a service provider in the event that the failure cannot be rectified with an OTA update.

The software product is configured so that a non-system SMS cannot trigger any functions of the communications device, even in the event that the code is correct. Thus, the software product is configured to detect the difference between an SMS message generated under normal network conditions and that generated by the CBC 22.

The software product of the invention is configured so that, when executed, the communications device becomes configured such that a volume of the SEWS is not able to be adjusted by a subscriber. In a preferred embodiment, the software product, when executed, configures the communications device such that only one alarm sound is generated, namely the SEWS. Furthermore, the communications device is configured such that pressing any button on the communications device stops the alarm. However, the text remains on the display until the subscriber manually deletes it with a suitable menu function or it is replaced by another message from the network operator.

The communications device can also be configured to retain previous messages with a date and time stamp to allow the user to view them again.

In the event that a network signal is lost, the communications device can be configured by the software product to display an appropriate message.

The communications device in accordance with the invention and configured by a software product, also in accordance with the invention can provide a function relating to a position of a subscriber. In other words, it can act as an emergency position indicating radio beacon (EPIRB). In that configuration, in the event that a subscriber requires emergency assistance he or she can activate a "help me" function. In that case, a pre-programmed SMS is sent to the N/O. The CBC 22, or related network equipment which is specifically configured to receive a "help me" activated SMS message from a subscriber in need, is configured to alert the N/O of the request for emergency assistance and to display the subscriber's personal details and tracking location.

Accordingly, the CBC or network equipment 22 can be configured to permit the N/O to interrogate the subscriber with a confirmatory message. In the event that the N/O receives the confirmatory message, the necessary emergency response can be mobilised.

This function is based on the ability to track a position of a communications device provided a transmission signal is generated by the communications device.

The mobile communications device can be configured so that the subscriber must press one or more pre-determined buttons on the communications device for a pre-determined amount of time. Alternatively, the mobile communications device may be configured so that a user can select a pre-determined option from a menu function.

The CBC or network equipment 22 contains required registers to identify the subscriber. Furthermore, the CBC or network equipment 22 is configured to process the incoming message and to alert the network operator. The CBC or network equipment 22 is also configured to send any message from a list of SMS messages with embedded codes to elicit pre-determined responses from communications devices logged into the system 10.

Set out below are any number of codes relating to the types of information to be conveyed to the communications devices subscribed to the system 10. For the purposes of this example, the codes are in the form of character strings which are shown below:

| Subscriber types | |
|---|---|
| 000 | All Subscribers and Organisations 000 |
| 100 | General Public 100 |
| 200 | Police Service 200 |
| 210 | Water Police 210 |
| 220 | SWAT 220 |
| 230 | Riot Police 230 |
| 240 | Traffic Police 240 |
| 300 | Military 300 |
| 310 | Army 310 |
| 320 | Air Force 320 |
| 330 | Navy 330 |
| 340 | Coast Guard 340 |
| 400 | Search and Rescue 400 |
| 500 | Fire department 500 |
| 600 | Ambulance and Medical 600 |

-continued

| | |
|---|---|
| 610 | Doctors and Nurses 610 |
| 700 | Government 700 |
| 800 | Special 800 |
| 900 | Secret 900 |
| | Disaster warnings 001 |
| 001ABCDEF1234 | Air crash |
| 001ABCDEF1235 | Air strike |
| 001ABCDEF1236 | Bush fire |
| 001ABCDEF1237 | Cancel disaster warning message |
| 001ABCDEF1238 | Cancel previous message |
| 001ABCDEF1239 | Cyclone |
| 001ABCDEF1240 | Dam wall breach |
| 001ABCDEF1241 | Dyke breach |
| 001ABCDEF1242 | Earthquake |
| 001ABCDEF1243 | Evacuate to xxxxx |
| 001ABCDEF1244 | Flood |
| 001ABCDEF1245 | Hurricane |
| 001ABCDEF1246 | Meteor strike |
| 001ABCDEF1247 | Nuclear threat |
| 001ABCDEF1248 | Terror attack |
| 001ABCDEF1249 | Text sent by N/O |
| 001ABCDEF1250 | Tsunami warning. Move to higher ground. |
| 001ABCDEF1251 | Typhoon |
| 001ABCDEF1252 | Volcano eruption |
| | Threat warning 002 |
| 002ABCDEF1253 | Bird flue |
| 002ABCDEF1254 | Blizzard |
| 002ABCDEF1255 | Bush fire |
| 002ABCDEF1256 | Cancel previous message |
| 002ABCDEF1257 | Cancel threat warning message |
| 002ABCDEF1258 | Chemical fire |
| 002ABCDEF1259 | Chemical spill |
| 002ABCDEF1260 | Civil unrest |
| 002ABCDEF1261 | Dam wall breach likely |
| 002ABCDEF1262 | Evacuate to xxxxx |
| 002ABCDEF1263 | Flash flood |
| 002ABCDEF1264 | Flood - River can burst banks |
| 002ABCDEF1265 | High Avalanche risk |
| 002ABCDEF1266 | Incoming ordinance |
| 002ABCDEF1267 | Possible Tsunami due to earthquake |
| 002ABCDEF1268 | Red tide |
| 002ABCDEF1269 | Severe cold weather |
| 002ABCDEF1270 | Severe winds |
| 002ABCDEF1271 | Spring tide and flooding |
| 002ABCDEF1272 | Terrorist attack |
| 002ABCDEF1273 | Text sent by N/O |
| 002ABCDEF1274 | Toxic spill |
| 002ABCDEF1275 | Tropical storm |
| | Advisory 003 |
| 003ABCDEF1276 | Avoid CBD |
| 003ABCDEF1277 | Avoid road travel until all clear message |
| 003ABCDEF1278 | Avoid xxxxx due to civil unrest |
| 003ABCDEF1279 | Blood donors required |
| 003ABCDEF1280 | Child abducted |
| 003ABCDEF1281 | Curfew from 7pm to 6am. Remain indoors |
| 003ABCDEF1282 | Dust storm |
| 003ABCDEF1283 | Police assistance message |
| 003ABCDEF1284 | Relocate to high ground |
| 003ABCDEF1285 | Remain indoors until all clear message |
| 003ABCDEF1286 | Severe hail storm expected |
| 003ABCDEF1287 | Severe lightning expected |
| 003ABCDEF1288 | Text sent by N/O |
| | System 004 |
| 004ABCDEF1289 | Maintenance advisory |
| 004ABCDEF1290 | Test message |
| 004ABCDEF1291 | Text sent by N/O |
| 004ABCDEF1292 | Reset MS to standby and cancel alarm mode |

Broadly, various groups or subscriber types are defined by the first 3 digits of the code. A list of possible identification digits is set out below. The following 3 digits or characters identify the types of information to be transmitted to the communications devices. The remaining characters determine more specifically the actual information components to be displayed on the communications devices.

In particular, a message contains 88 octets of data, 82 of which contain the coding for the actual user. The 88 octets of the CB message contain the following data: serial number, message identifier, data coding scheme, page parameter and subscriber data (with the code message). An example of how a particular message can be processed is set out below:

CBS code received by MS: 100001ABCDEF1250 a. Isolate first 3 characters of code—100 (General public)
b. Is code=MS pre-set subscriber type code?
c. If yes, continue to next step.
d. Isolate characters 4 to 16 of the code—001ABCDEF1250.
e. Compare code to database—001ABCDEF1250
f. If code exists, continue, otherwise stop.
g. Execute programmed reaction to characters 4, 5 and 6.
h. Display corresponding information component on display of MS.

Tsunami Warning—Move to Higher Ground

As mentioned earlier, the message includes digits/characters that distinguish between subscribers and other systems such as those used by the military or emergency services. All communications devices 28 camping on a BTS 26 receive the coded data transmitted by the BTS 26. However, on such communications devices as GPRS mobile phones, the incoming code is irrelevant.

In connection with the "subscriber types", the software product is configured to query whether the first three digits correspond to a subscriber type that is permitted to receive the message. For example, if a query on the first three digits returns a "1" then that subscriber type can receive the message. Thus, if the first three digits are "200" and the communications device is subscribed to a member of the general public, the software product will return a "0" and the message will terminate.

On receipt of a specific coded message, the subscribed communications devices react according to the pre-programmed internal code list. A message as per the list is then displayed on a display means (usually an LCD) of the communications device and the communications device reacts accordingly, as described above.

For example, a tsunami warning code activates the SEWS alarm, flashes the lights, vibrates and then displays a warning message that could be: "tsunami warning is in effect. Move away from the coast to higher ground. Monitor public radio broadcasts for more information." A further example may include warnings on child kidnapping, or the like. A more detailed list is set out below:

| Possible EDWARDS CBS Subscriber group codes and message type codes | |
|---|---|
| Subscriber types | |
| 000 | All Subscribers and Organisations 000 |
| 100 | General Public 100 |
| 200 | Police Service 200 |
| 210 | Water Police 210 |
| 220 | SWAT 220 |
| 230 | Riot Police 230 |
| 240 | Traffic Police 240 |
| 300 | Military 300 |
| | Cancel previous message |
| | Emergency reserve forces call up |
| | Hold current position |
| | Incoming ordinance |
| | Report to unit ASAP |
| | Report to unit in 24 hours |
| | Report to unit in 48 hours |
| | Return to base |

-continued

| Possible EDWARDS CBS Subscriber group codes and message type codes | |
|---|---|
| | Text sent by N/O |
| | Threat from (various bearings) |
| | Use chemical warfare protection |
| 310 | Army 310 |
| 320 | Air Force 320 |
| 330 | Navy 330 |
| 340 | Coast Guard 340 |
| 400 | Search and Rescue 400 |
| 500 | Fire department 500 |
| 600 | Ambulance and Medical 600 |
| 610 | Doctors and Nurses 610 |
| 700 | Government 700 |
| 800 | Special 800 |
| 900 | Secret 900 |
| | Message Types |
| 001 | Disaster warnings |
| | Air crash |
| | Air strike |
| | Bush fire |
| | Cancel disaster warning message |
| | Cancel previous message |
| | Cyclone |
| | Dam wall breach |
| | Dyke breach |
| | Earthquake |
| | Evacuate to xxxxx |
| | Flood |
| | Hurricane |
| | Meteor strike |
| | Nuclear threat |
| | Terror attack |
| | Text sent by N/O |
| | Tsunami |
| | Typhoon |
| | Volcano eruption |
| 002 | Threat warning |
| | Bird flue |
| | Blizzard |
| | Bush fire |
| | Cancel previous message |
| | Cancel threat warning message |
| | Chemical fire |
| | Chemical spill |
| | Civil unrest |
| | Dam wall breach likely |
| | Evacuate to xxxxx |
| | Flash flood |
| | Flood - River can burst banks |
| | High Avalanche risk |
| | Incoming ordnance |
| | Possible Tsunami due to earthquake |
| | Red tide |
| | Severe cold weather |
| | Severe winds |
| | Smog alert |
| | Spring tide and flooding |
| | Terrorist attack |
| | Text sent by N/O |
| | Toxic spill |
| | Tropical storm |
| 003 | Advisory 003 |
| | Avoid CBD |
| | Avoid road travel until all clear message |
| | Avoid xxxxx due to civil unrest |
| | Blood donors required |
| | Child abducted |
| | Curfew from 7pm to 6am. Remain indoors |
| | Dust storm |
| | Police assistance message |
| | Relocate to high ground |
| | Remain indoors until all clear message |
| | Severe hail storm expected |
| | Severe lightning expected |
| | Text sent by N/O |
| 004 | System 004 |

-continued

| Possible EDWARDS CBS Subscriber group codes and message type codes |
|---|
| Maintenance advisory |
| Test message |
| Text sent by N/O |
| Reset MS to standby and cancel alarm mode |

Consider the code 100002AD1F4E7B8C. That code is broken, for example, into the following:

a. 100—subscriber type i.e. general public subscriber base.

b. 002—type of message i.e. threat warning.

c. AD1F4E7B8C—database text code i.e. spring tide and flood warning.

A CBS message is generally limited to 88 octets of data. This restricts the size of the text message sent with any one CBS. The code activated text message on the communications device can have many more characters and is only limited to the memory of the communications device, which is typically substantially more than 88 octets of data.

As set out above, the CBC or network equipment 22 is also configured to send any message from a list of SMS messages a sample of which is set out below:

Activation
Deactivation
Emergency services dispatched to your location
MS faulty. Return to supplier
ME services available. Will dispatch to you ASAP.
OTA Code update patch
Please phone xxxxxx urgently
Renew subscription
Text sent by N/O
Warning of suspension Military Messages Cancel previous message
Emergency reserve forces call up
Hold current position
Incoming ordinance
Report to unit ASAP
Report to unit in 24 hours
Report to unit in 48 hours
Return to base
Text sent by N/O
Threat from (various bearings)
Use chemical warfare protection In FIG. 2, reference numeral 30 generally indicates a flowchart representing at least part of an embodiment, in accordance with the invention, of a software product used to process a message transmitted by the CBC 22. The software product 32 is carried either in the communications device per se or in a SIM used by the communications device.

At 32, the communications device receives the message. At 34, the communications device compares the first 3 characters in the message with a list of authorized organisations to determine the recipients of the message.

At 36, the software product queries whether or not there is a matching code. In the event that the query returns a negative, the process ends at 38. If the query returns a positive, the fourth to the sixteenth characters are compared to the code list stored in the communications device, as described earlier at 40.

At 42, the software product queries whether or not there is a match to the code. In the event that the query returns a negative, the process ends at 44. Alternatively, in the event that the query returns a positive, the software product reads characters 4, 5 and 6 at 46.

At 48, the software product queries whether or not characters 4, 5 and 6 are 001 or 002. In the event that the query returns a positive, the software product queries whether or not the code includes code for a text message at 72. If the query at 72 returns a negative, the software product displays text as per the code list on a LCD of the communications device, flashes the lights, vibrates and plays the SEWS alarm at 50.

At 52, the software queries whether or not the step 50 is to be stopped. If the query returns a positive, the process ends at 54. In the event that the query returns a negative, the process returns to 50 to continue displaying the text etc.

Returning to query 72, if that query returns a positive, the software product displays text in the message on a LCD of the device, flashes the lights, vibrates and plays the SEWS alarm at 74, as appropriate. At 76 the software product must acknowledge receipt of the message to the MS, and will be instructed to stop at 78. Else the process returns to 74, as shown.

Returning to query 48, if that query returns a negative, the product queries whether the 3 characters are 003 at 49. In the event that the query returns a negative, the communications device displays nothing and remains silent at 55.

At 56, the software product queries whether or not the code is the hourly test message. If the query 56 returns a negative, the product queries, at 58, whether the code is the code for another procedure or message. In the event that the query 58 returns a negative, the process ends at 60. If the query 58 returns a positive, the software product is configured such that the communications device follows a programmed procedure at 62. That process ends at 64.

Returning to the query 56, if the query 56 returns a positive, control passes to 62.

Returning to the query 49, if the query 52 returns a positive, the software product is configured so that the communications device can display text as per the code list or as per the text in the CBS on the LCD, flash lights, play a standard beep or a tone at 66. At 68, the software queries whether or not the message generated at 66 has been acknowledged or should be stopped. In the event that the query 68 returns a positive, the process ends at 70. Alternatively, the step at 66 is continued.

The acknowledge process at 52, 76, and 68 also makes provision for a time delay as well as a counter for the number of loops in order to conserve battery life balanced with eventually warning the subscriber. After a programmed number of loops, the alarm will sound with larger intervals or could stop.

Figure 3:
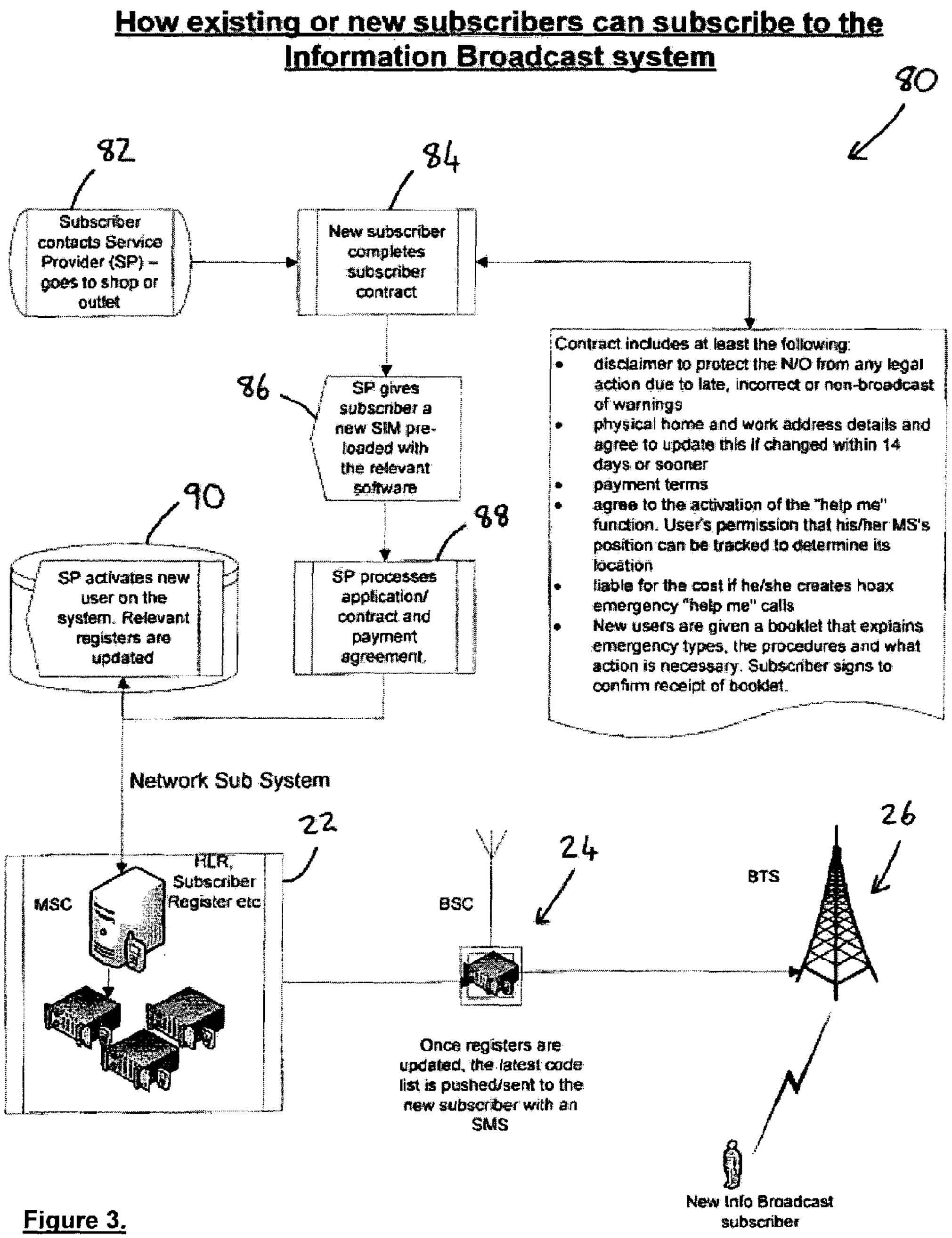
FIG. 3 shows a layout of a method used to subscribe to the system of FIG. 1.

In FIG. 3, reference numeral 80 generally indicates an outlay of the process which a communications device user can use to subscribe to the system 10.

At 82, the subscriber contacts the service provider either online or physically at a shop or other outlet. At 84, the new subscriber completes the necessary contract. At 86, the service provider gives the subscriber a new SIM pre-loaded with a software product of the invention. At 88, the service provider processes the application and the contract and the payment agreement. Then at 90, the service provider activates the new subscriber on the system 10 and the relevant registers referred to earlier are updated. As can be seen, the step at 90 is carried out at the CBC 22 and the latest code is pushed to the new subscriber with an SMS via BSC 24 and BTS 26. The uploaded code text can be in the subscriber's language of choice if available.

Figure 4:
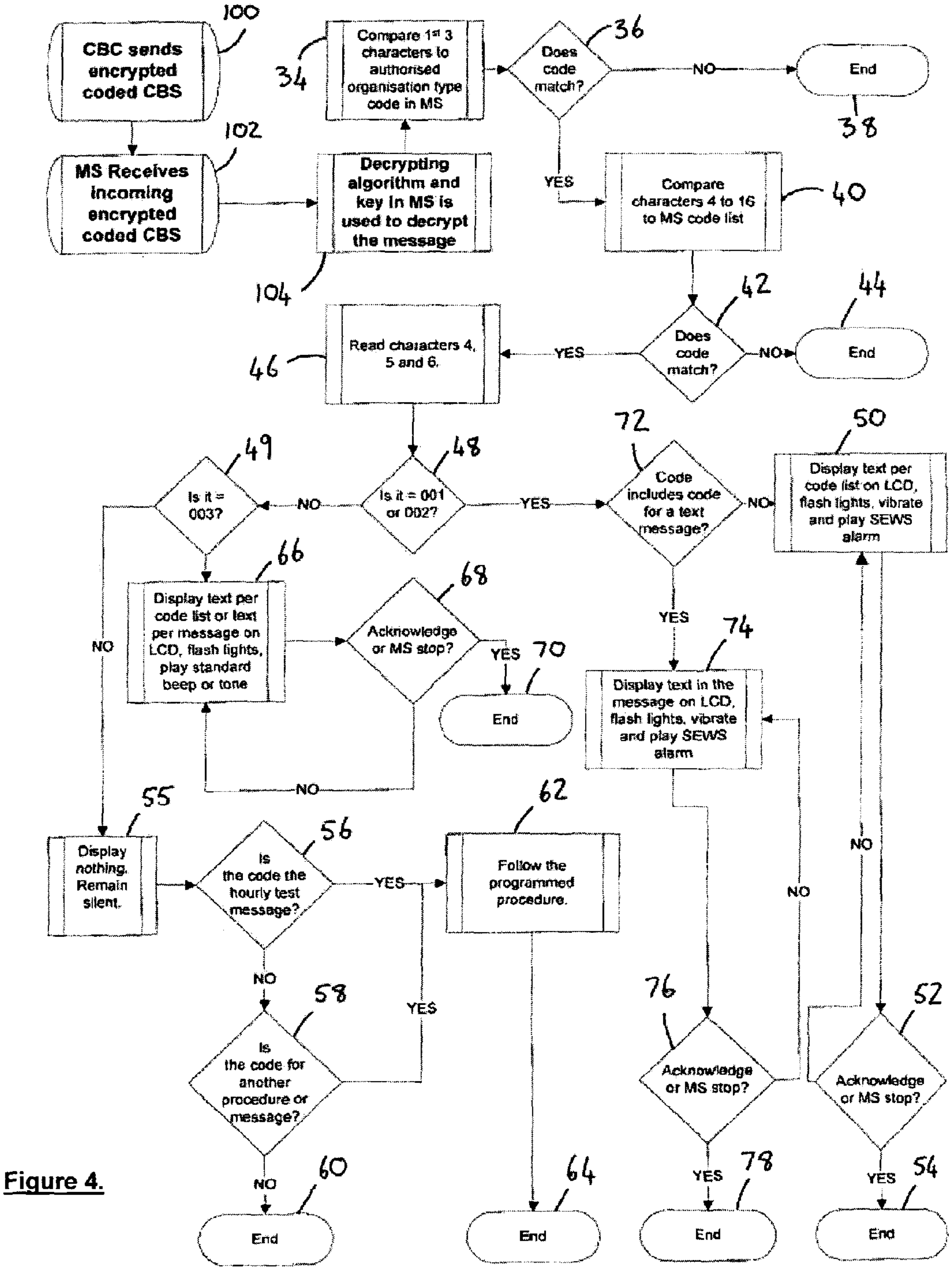
FIG. 4 shows a further embodiment of a software product for execution by an embodiment, in accordance with the invention, of a communications device for use with the system of FIG. 1.

FIG. 4 shows a flowchart for a software product, in accordance with the invention, where encryption is employed on the CB Short Message service (CBS). The process is largely similar to the method shown in FIG. 2, except instead of the MS receiving the CBS, the CBC transmits an encrypted coded CBS to the MS, as at 100. With reference to FIG. 3, like numerals refer to like parts, unless otherwise specified.

The MS receives the encrypted coded CBS at 102, and a decrypting algorithm is used at 104, together with a decrypting key of the MS, to decrypt the message. The message then undergoes similar process steps as those shown in FIG. 2.

As such, messages can be sent to the MSs using an alternative coding method as follows:

When a user is registered on the system or subscribed, a decoding key is uploaded via a system SMS to the user's MS.

An encrypted EDWARDS message can now be sent by the CBC or CBE.

When an encrypted CBS message is received by a MS, the decoding key along with decryption software in the subscriber's MS is used to decode or decrypt the message.

Figure 2:
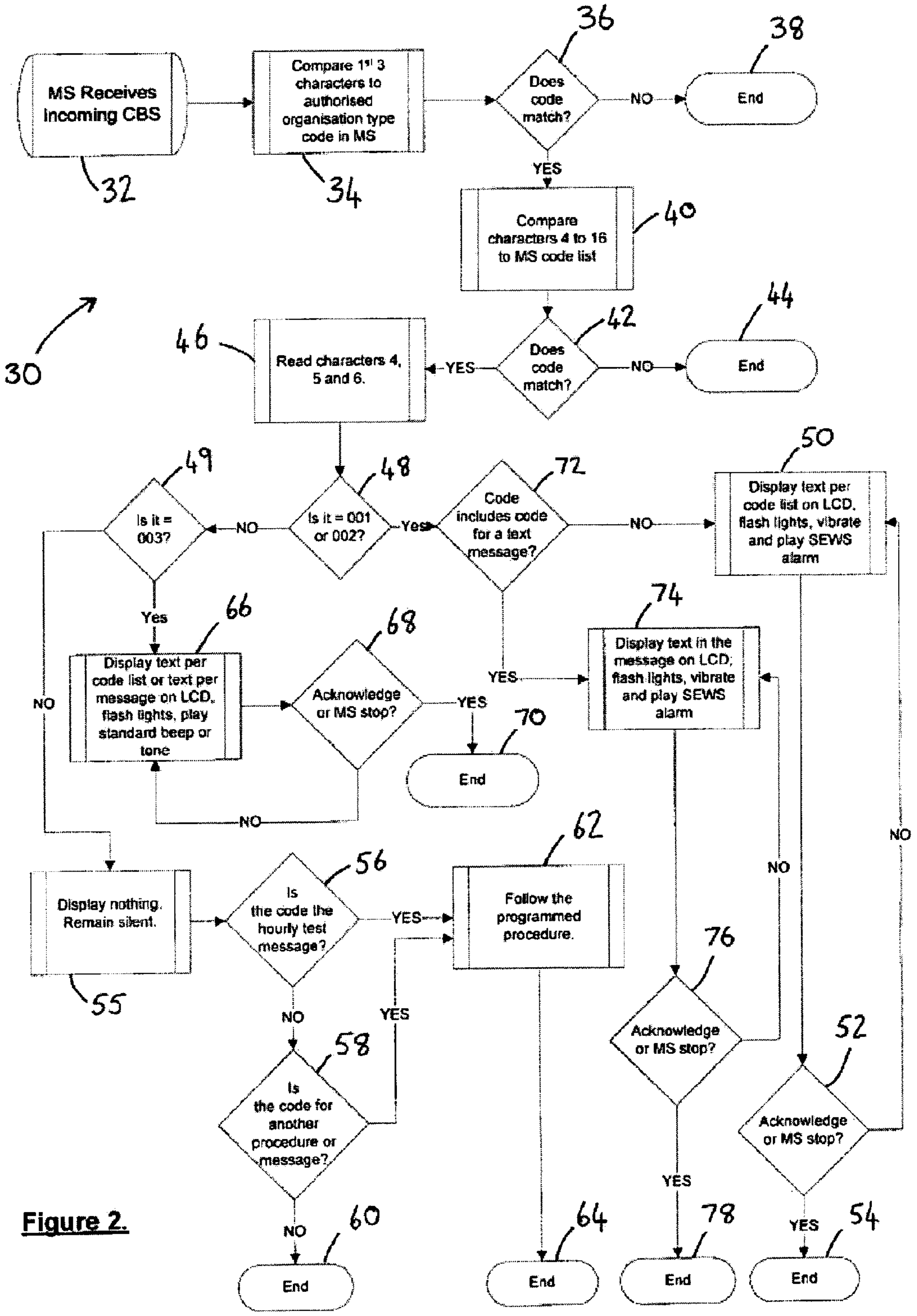
FIG. 2 shows a flowchart of an embodiment, in accordance with the invention, of a software product for execution by an embodiment, in accordance with the invention, of a communications device for use with the system of FIG. 1.

The same process is followed as described in FIG. 2.

This method is an alternative method and can be used to send CBS messages to MSs containing the warning text that should be displayed on MSs.

The decoding or decryption key can be updated to all users on a regular basis (such as monthly). If a subscriber no longer subscribes, they will not receive the new code and will not be able to decode any future EDWARDS messages.

This method allows the N/O securely to send any text message to a user and not only the suggested standard set message codes that will call up a text message from the MS database. A message coded in this way can also cause a message stored on the MS to be displayed if required.

The coded message also contains a number or code that identifies the target user group, a code for the type of message and a code for the desired reaction from the EDWARDS enabled MS. This is according to the code shown in FIGS. 2 and 3 above.

When a user unsubscribes, a system SMS can be sent to the MS with an invalid decoding key. This will ensure that future coded messages cannot be decoded by that MS.

In different embodiments, the warning message may contain the following elements, as identified by the specific code as described above:

Subscriber type, target group or organisation code.

Message type.

Additionally the message sent from GSDMG to the CBE will contain information either in coded or direct form relating to:

i. Event type.
ii. Target area or areas for the CBS.
iii. The message code or text.
iv. Message expiry date and time.
v. Sender (GSDMG or Weather Bureau or other authorised party).

A software product on the MS selects the desired CB channel(s) to be used by the system 10. The software product on the MS is configured to select one of a set number of CB channels depending on the default language set on the MS. If the default language does not match an available channel, then the software product selects the default CB channel as English, depending on the geographical location. This function provides for the possibility of sending a warning message in different languages at the same time.

In case of an emergency it is important for the message to originate from a trustworthy and reliable source. For example, in Australia the message will originate from the relevant Government State Disaster Management Groups, or the like.

The software product of the invention is configured so that incoming alerts on an MS do not cut off any online calls or communication. The software product is configured to permit the warning message to be received in a manner such that the user can interrupt an engaged communication to check the warning message and then resume the communication.

The system of the invention is configured to permit users to discontinue a subscription. However the system is configured so that certain messages associated with a predetermined level of urgency, such as those associated with a national emergency are transmitted to all devices.

In one embodiment, the system of the invention is configured to include satellite transmission as a protocol for the broadcast of emergency messages. The broadcast is then sent to all MSs logged into that satellite and in its footprint.

Applicant also considers embodiments where the communication devices are remote alarm stations. For example, many people in less affluent communities do not all have mobile phones. These areas can be covered by strategically locating remote alarm stations. These can consist of a mobile phone in a secure box (perhaps on a pole), with a solar panel to charge the battery if local power is not available. The mobile phone is connected to an amplifier and an outdoor speaker. On receipt of an emergency message the SEWS alarm will sound. In these embodiments, the system can be configured to generate an all clear message that, in turn, generates an all clear signal that is distinct from the SEWS alarm.

The Applicant believes that this invention provides a means whereby authorities can effectively and clearly communicate with large segments of the population in certain geographical areas. This can be most useful in the event of a natural disaster or any other event that threatens lives in the area. Not only does the system 10 provide a means for conveying an alarm, it also provides a means for conveying specific messages to subscribers, as detailed above.

The system 10 provides an advantage over other CB message broadcasting systems in that it permits a secure message to be broadcast. Thus, for example, in the case of an emergency, specific messages can be broadcast to specific groups. This is useful in that it is often not desirable that all the subscribers receive a message specifically intended for a particular group of subscribers, such as the police or military, for example.

Furthermore, use of a "proactive" software product, such as that loaded onto the SIM, as described earlier, allows subscribed communications devices to generate a specific, unique signal that is immediately discernible by the subscribers.

It is to be appreciated that the system 10 has uses that extend beyond those related to emergencies and disasters. For example, a group of users could be military or similar personnel. Where such a group exists, it is often necessary to provide that group with instructions specific to that group. In that case, the first three digits of the coded data described above can be representative of that group so that only that group receives the message.

It is to be understood that the present invention, in accordance with at least one presently preferred embodiment, includes an information broadcasting system, a method of broadcasting information, and a software product for the system and executable by a communications device subscribed to the system. One or more of these elements may be implemented on at least one general-purpose or application-specific data processor and/or communications device running suitable computer programs including the preferred embodiment of the computer program product. They may also be implemented on at least one integrated circuit or part of at least one integrated circuit. Thus, it is to be understood that the invention may be implemented in hardware, software, or a combination of both.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. An information broadcasting system for broadcasting information to subscribed communications devices of the system, the system including:

a receiving module configured to receive information from a monitoring authority;

a transmitting module, operatively coupled to the receiving module configured to receive the information from the receiving module and to generate a Cell Broadcast Short Message (CBS) message, wherein the CBS message comprises coded data associated with the received information that is to be relayed to the subscribed communications devices in at least one pre-selected geographical location, wherein the coded data is configured to correspond with information components stored on the subscribed communications devices and the coded data is configured to identify a plurality of specific groups subscribed communications devices, wherein the subscribed communications devices of the plurality of specific groups are configured to generate, in response to the CBS message, notifications corresponding to information components stored on the subscribed communications devices of the plurality of specific groups, while the other subscribed communications devices do not.

2. The information broadcasting system of claim 1, wherein the receiving module is configured to permit an operator to select one or more geographical locations to which the coded data is to be relayed.

3. The information broadcasting system of claim 1, wherein the receiving module is configured to select one or more geographical locations automatically according to the information received from the monitoring authority.

4. The information broadcasting system of claim 1, wherein the notification corresponding to said at least one information component is a text message displayed on the communications devices.

5. The information broadcasting system of claim 1, wherein the information component relates to specific information for the subscribed communication devices with respect to the information generated by the monitoring authority.

6. The information broadcasting system of claim 1, wherein the transmitting module is configured to transmit the coded data corresponding with information components stored in a memory of the communications devices.

7. The information broadcasting system of claim 1 comprising Base Station Controllers (BSCs) in pre-selected geographical locations.

8. The information broadcasting system of claim 7, wherein the BSCs are configured to receive the coded data from the transmitting module which is configured to transmit the coded data to a BSC in a geographical location where subscribers are to receive the information.

9. The information broadcasting system of claim 8, wherein relaying stations include Base Transceiver Stations (BTS's) and the BSC's are configured to relay the data to the BTS's in the geographical location.

10. The information broadcasting system of claim 1, wherein coded data generated by the transmitting module is configured to actuate pre-programmed instructions stored in the subscribed communications devices to cause the devices to generate a unique signal to be provided to a subscriber.

11. The information broadcasting system of claim 10, wherein the devices generate a unique signal selected from the group consisting of a vibrating signal, a display of the device displaying a text message, an audible alarm, and lights of the device flashing.

12. A method of broadcasting information over a selected geographical area to a plurality of subscribed communication devices, the method including the steps of:

receiving the information from a monitoring authority;

generating a Cell Broadcast Short Message Service (CBS) message that comprises coded data relating to the received information; and relaying the CBS message to the plurality of subscribed communications devices in the at least one pre-selected geographical location, wherein the coded data is configured to correspond with at least one information component stored on the plurality of subscribed communications devices and to identify a specific group of the subscribed communications devices, such that when the plurality of subscribed communications devices of the specific group receive the CBS message, the specific group of the plurality of subscribed communications devices generate a notification corresponding to said at least one information component whereas the other subscribed communications devices do not.

13. A subscribed communications device for use with an information broadcasting system for broadcasting information to subscribers of the system, the communications device including;

a data storage device in which at least one information component is stored relating to a Cell Broadcast Short Message Service (CBS) message that includes coded data generated by the information broadcasting system; and a data processor that is configured to match the CBS message with at least one stored information component to identify a specific group of subscribers, such that when subscribed communications devices of a specific group receive the CBS message a notification corresponding to said at least one information component is generated on the specific group of subscribed communications devices and not by the other subscribed devices.

* * * * *